United States Patent
Bryant

(10) Patent No.: US 10,981,587 B2
(45) Date of Patent: Apr. 20, 2021

(54) REMOVABLE HAND TRUCK LIFT SYSTEM

(71) Applicant: Joshua Donald Bryant, Miramar, FL (US)

(72) Inventor: Joshua Donald Bryant, Miramar, FL (US)

(*) Notice: Subject to any disclaimer, the term of this patent is extended or adjusted under 35 U.S.C. 154(b) by 190 days.

(21) Appl. No.: 16/228,063

(22) Filed: Dec. 20, 2018

(65) Prior Publication Data
US 2019/0185037 A1 Jun. 20, 2019

Related U.S. Application Data

(60) Provisional application No. 62/608,085, filed on Dec. 20, 2017.

(51) Int. Cl.
  *B62B 1/12* (2006.01)
  *B62B 1/02* (2006.01)
  *B62B 1/14* (2006.01)

(52) U.S. Cl.
  CPC ............ *B62B 1/12* (2013.01); *B62B 1/02* (2013.01); *B62B 1/14* (2013.01); *B62B 2203/10* (2013.01)

(58) Field of Classification Search
  CPC ....................... B62B 2203/10; B66F 5/025
  See application file for complete search history.

(56) References Cited

U.S. PATENT DOCUMENTS

| | | | | |
|---|---|---|---|---|
| 5,829,763 A * | 11/1998 | Jeavons | ........... | B62B 5/023 280/5.3 |
| 6,309,168 B1 * | 10/2001 | Holmes | ........... | B62B 1/14 414/444 |
| 6,398,477 B1 * | 6/2002 | Fox | ........... | B66F 9/06 414/490 |
| 6,457,727 B1 * | 10/2002 | Tolly | ........... | B62B 1/14 280/47.19 |
| 6,530,740 B2 * | 3/2003 | Kim | ........... | B62B 1/002 180/251 |
| 10,246,315 B2 * | 4/2019 | Combs | ........... | B66F 9/075 |

* cited by examiner

*Primary Examiner* — Mark C Hageman
(74) *Attorney, Agent, or Firm* — Fresh IP PLC; John R. Bednarz

(57) ABSTRACT

A removable lift for a hand truck for providing lifting functions to a traditional hand truck. The removable lift includes a motor for causing a toe plate to move up or down. The motor and moving toe plate may be operated using a control panel.

19 Claims, 8 Drawing Sheets

REMOVABLE HAND TRUCK LIFT SYSTEM

CROSS REFERENCE TO RELATED APPLICATION

This application claims priority from U.S. Provisional Application Ser. No. 62/608,085 filed on Dec. 20, 2017, which is hereby incorporated by reference in its entirety.

FIELD

The present disclosure relates to a platform lift attachment for use with a wheeled, hand-propelled vehicle, such as a hand cart. More particularly, it concerns a universal lift platform for use with convertible hand trucks, with a unique design in which the lift platform may be attached to a hand truck to add lifting abilities to a hand truck.

BACKGROUND

Hand carts, dollies, or hand trucks provide an efficient way for a single individual to move a heavy load by sliding it onto a flat ledge and using leverage to balance the load over a pair of wheels. This enables the load to be rolled, rather than lifted and carried, to a selected location. Hand trucks generally consist of an elongated open framework with wheels at the base and a transverse, flat toe plate. In the upright position, the toe plate rests on the floor and can be slid under the load and used to tip the load backward onto the frame. The hand truck is rolled in a tipped position, with the load balanced between the toe plate and the open framework. Hand trucks are unloaded by lifting or pushing cargo off of the toe plate. Hand carts have been used within many different industries for the transportation of many diverse types of items.

Loads placed on hand trucks are often heavy. Lifting these heavy loads may result in a user dropping the loads or not being able to lift the load at all. Additionally, a user lifting a heavy load may risk injury.

Thus, there is a need for a universal platform or toe plate that can be used on hand trucks available from a wide variety of manufacturers, that can be easily installed and removed by a user without the need for tools and fasteners, and that can lift heavy loads.

SUMMARY

The present disclosure provides a greatly improved removable lift attachment for use with a hand cart or truck. The removable lift is lightweight and easy to install on a hand truck or hand cart, and can be allowed to remain in place. The removable lift attachment may be easily and quickly removed and reinstalled and may be used on a wide variety of hand trucks.

As an example, a removable lift for use with a convertible hand cart may include a housing having a top surface, a bottom surface, a rear surface, and a front surface. The removable lift may further comprise at least one top connector and at least one bottom connector. The removable lift may also include a control panel. The removable lift may also include a base that has a toe plate. The removable lift may also include at least one motor connected to a lift screw. The removable lift may also include a toe plate support having a bottom surface and a top surface, and at least one aperture, and at least one guide rail having a top end and a bottom end, wherein the top end is connected to the housing and the bottom end is received by the base, and wherein the bottom end is connected to the toe plate support. The top connectors may be configured for attachment to a top bar of a hand truck. The bottom connectors may be configured for attachment to a side bar of a hand truck. The top connectors may be slidably attached to the rear surface of the housing. The bottom connectors may be slidably attached to the toe plate support. The top connectors may be pivotally attached to the rear surface of the housing. The bottom connectors may be pivotally attached to the toe plate support. The motor may be a hydraulic motor. The control panel may have at least one switch.

As another example, a removable lift for use with a convertible hand cart may include a housing having a top surface, a bottom surface, a rear surface, and a front surface. The removable lift may also include at least one top connector connected to the rear surface of the housing. The removable lift may also include at least one bottom connector. The removable lift may also include a control panel. The removable lift may also include a base that has a toe plate. The removable lift may also include at least one motor. The removable lift may also include a toe plate support. The toe plate support may have a surface, a top surface, and at least one aperture. The removable lift may also include a first guide rail and a second guide rail. The first and second guide rails may have a top end and a bottom end. The top ends of the guide rails may be connected to the housing. The bottom ends of the guide rails may be received by the base. The bottom ends of the guide rails may also be connected to the toe plate support. The control panel may include a first switch and a second switch. The first switch and the second switch may be in communication with the motor. The first switch may be actuatable for moving the base up. The second switch may be actuatable for moving the base down. The motor may be a mechanical linear actuator. The motor may also be a hydraulic actuator. The top connectors may be clamps. The at least one bottom connector may be a clamp. The top connectors may be slidably attached to the rear surface of the housing. The removable lift may be collapsible.

As an additional example, a load may be lifted by attaching a removable lift to a hand truck. The removable lift may have a housing. The housing may have a top surface, a bottom surface, a rear surface, and a front surface. The removable lift may also include at least one top connector connected the rear surface of the housing. The removable lift may also include at least one bottom connector. The removable lift may also include a control panel. The removable lift may also include a base that has a toe plate. The removable lift may also include at least one motor. The removable lift may also include a toe plate support that has a bottom surface, a top surface, and at least one aperture. The removable lift may also include a first guide rail and a second guide rail. The first and second guide rails may have top end and bottom ends. The top ends of the guide rails may be connected to the housing. The bottom ends of the guide rails may be received by the base. The bottom ends of the guide rails may be connected to the toe plate support. The removable lift may be loaded by placing a load on the toe plate. The load may be lifted by actuating the toe plate to lift the load. The control panel of the removable lift may also include at least one switch. The toe plate may be actuated by moving the switch. The top and bottom connectors may be clamps that can be clamped onto a top bar of the hand truck and the side bars of the hand truck.

The removable lift for use with a convertible hand cart may include a housing. The housing has a top surface opposite a bottom surface, and a rear surface opposite a front surface. The housing houses the battery, motor, and control panel. The rear surface of the housing has top connectors attached. The top connectors may be adjustable in order to be connected to the top bar of various hand trucks.

The housing of the removable lift is connected to a base and a toe plate support using guide rails and a lift screw. The removable lift may include a motor for causing the lift screw to rotate which causes the base to move up or down.

The removable lift is installed on a hand truck by clipping the top connectors and bottom connectors to the top bar and side bars of a hand truck. The removable lift is used by placing a load on the base toe plate. After placing a load on the base toe plate, the load may be lifted. A user lifts the load by pressing and actuating a switch on the control panel. Once the load has been lifted to a desired height, a user may remove the load from the base toe plate.

Various objects, features and advantages of this disclosure will become apparent from the following detailed description, which, taken in conjunction with the accompanying drawings, which depict, by way of illustration and example, certain embodiments of this removable lift attachment.

BRIEF DESCRIPTION OF THE DRAWINGS

In order to describe the manner in which the advantages and features of the present inventive concept can be obtained, reference is made to embodiments thereof which are illustrated in the appended drawings. Understanding that these drawings depict only exemplary embodiments of the present inventive concept and are not, therefore, to be considered to be limiting of its scope, the principles herein are described and explained with additional specificity and detail through the use of the accompanying drawings in which.

DETAILED DESCRIPTION

Figure 1:
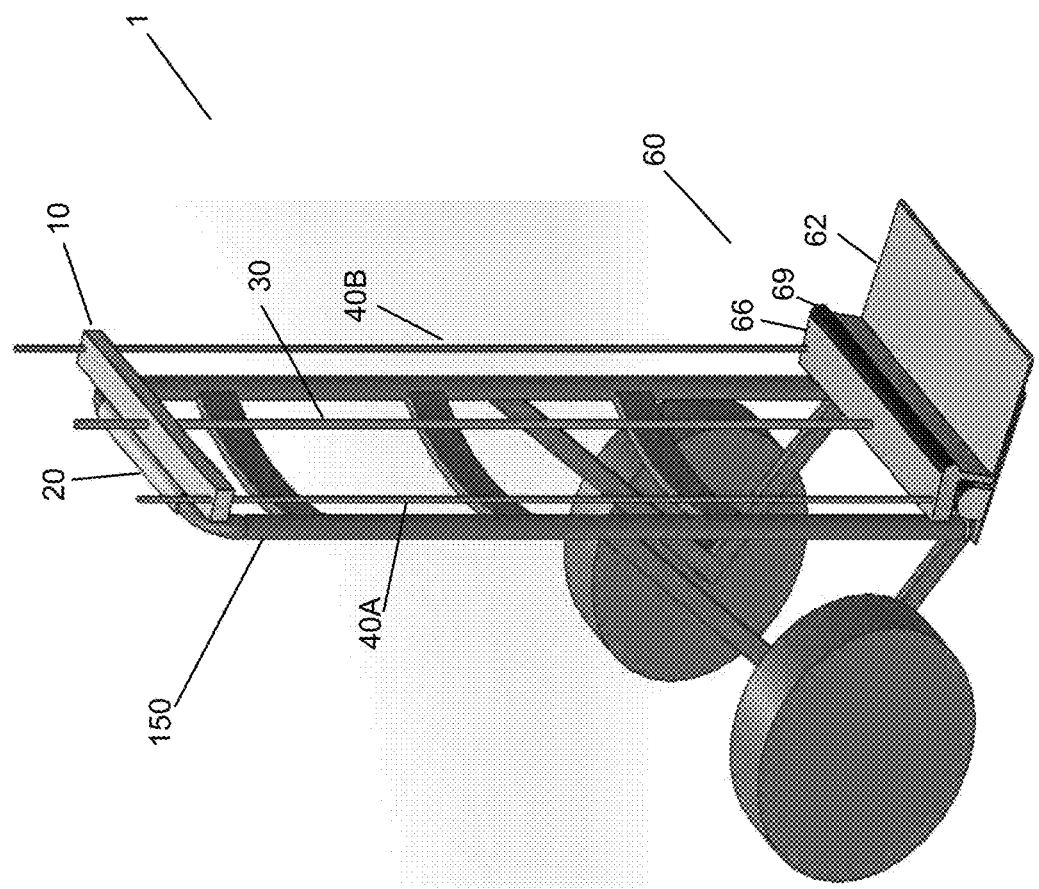
FIG. 1 is a perspective view of a removable lift attachment in accordance with the disclosure shown in association with an exemplary hand truck in a recumbent position.

A removable lift for a hand truck constructed according to the present disclosure is generally designated by the reference numeral 1 and is shown in FIG. 1 in an exemplary installation on one type of hand cart or hand truck 150. The hand truck is depicted in a recumbent position with two ground-engaging wheels. The removable lift provides a solid surface for use on a hand truck that allows for a load to be lifted above a hand truck toe plate 152. The removable lift 1 is operable to be removably attached to a hand truck 150. The removable lift 1 may include a top housing 10, a lift base 60, one or more rails 40 A-B, a toe plate support 54, and a lift screw 30.

The top housing 10 may have a housing top surface 11 opposite a housing bottom surface 13. As shown in FIG. 1, the top housing 10 may include at least one rail aperture 12 A-B. The housing rail apertures 12 A-B extend from the housing top surface 11 to the housing bottom surface 13. The top housing 10 may also include a housing screw aperture 14 that is operable to accept the lift screw 30. The housing screw aperture 14 extends from the housing top surface 11 to the housing bottom surface 13. The rail apertures 12 A-B may be operable to accept the guide rails 40 A-B. However, in another example, the guide rails 40 A-B may not extend through the top housing 10. The housing screw aperture 14 may include threads for coupling the lift screw 30 to the top housing 10.

The top housing 10 of the removable lift 1 is connected to the lift base 60 by the guide rails 40 A-B and the lift screw 30. In this regard, the lift base 60, the guide rails 40 A-B and the lift screw 30 form a frame. The guide rails 40 A-B may be perpendicular to the top housing 10. The top housing 10 also includes a housing screw aperture 14 that is operable to accept the lift screw 30. The lift screw 30 may be perpendicular to the top housing 10, and parallel to the guide rails 40 A-B. In another example, the guide rails 40 A-B may have orientations that are not perpendicular to the top housing 10.

Figure 2:
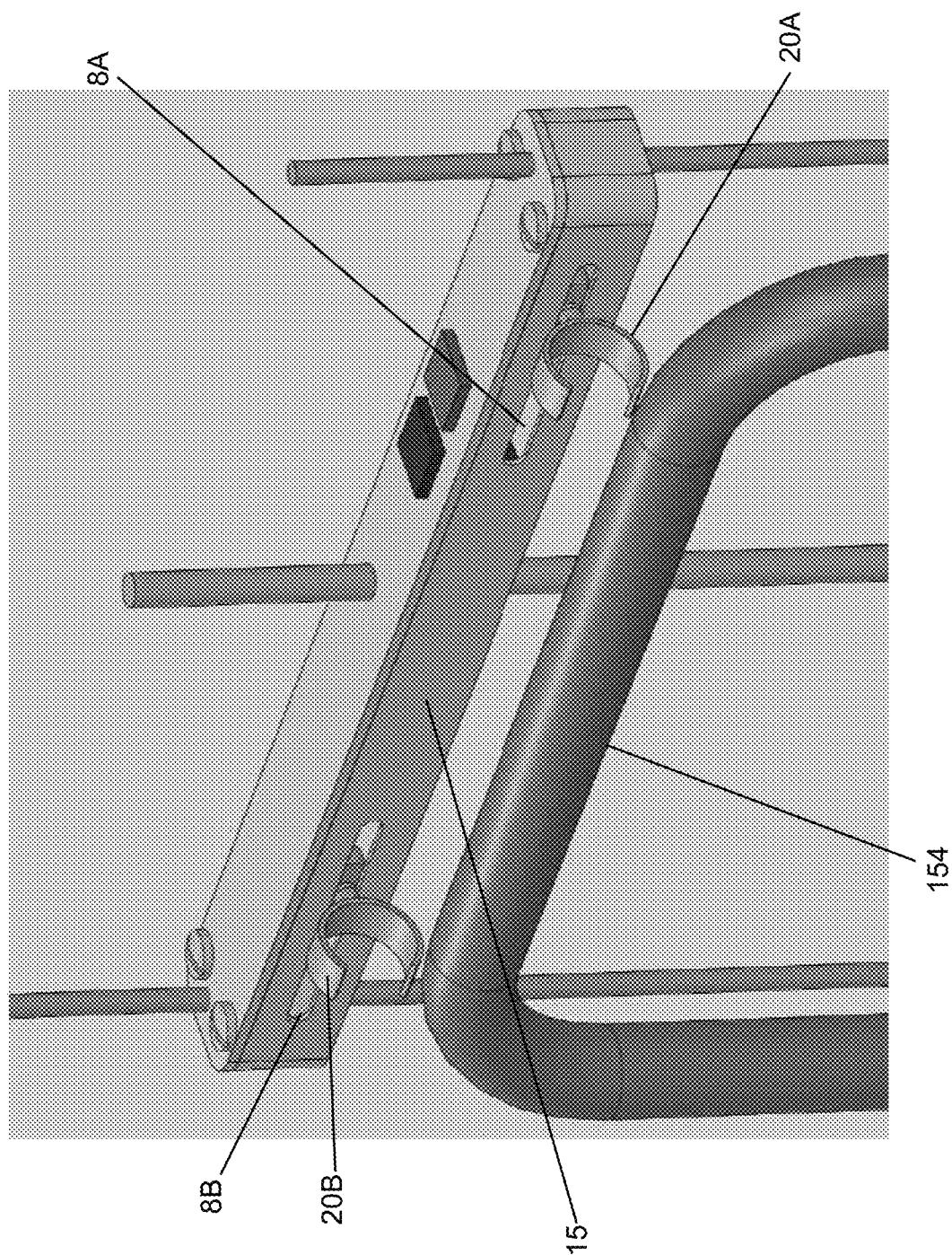
FIG. 2 is a perspective view of the housing and control panel of the removable lift.
Figure 5:
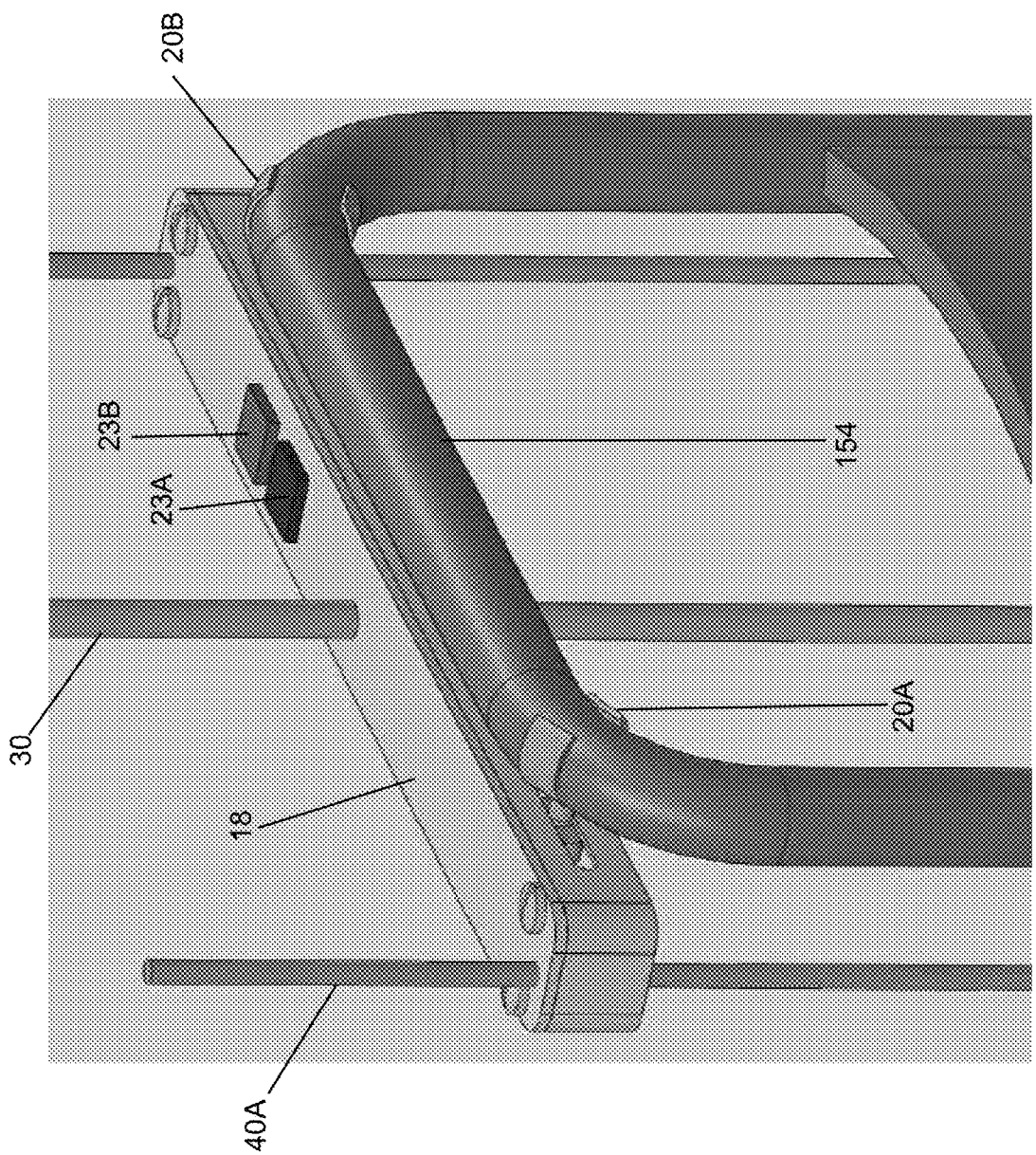
FIG. 5 is a view of a top portion of the removable lift.
Figure 6:
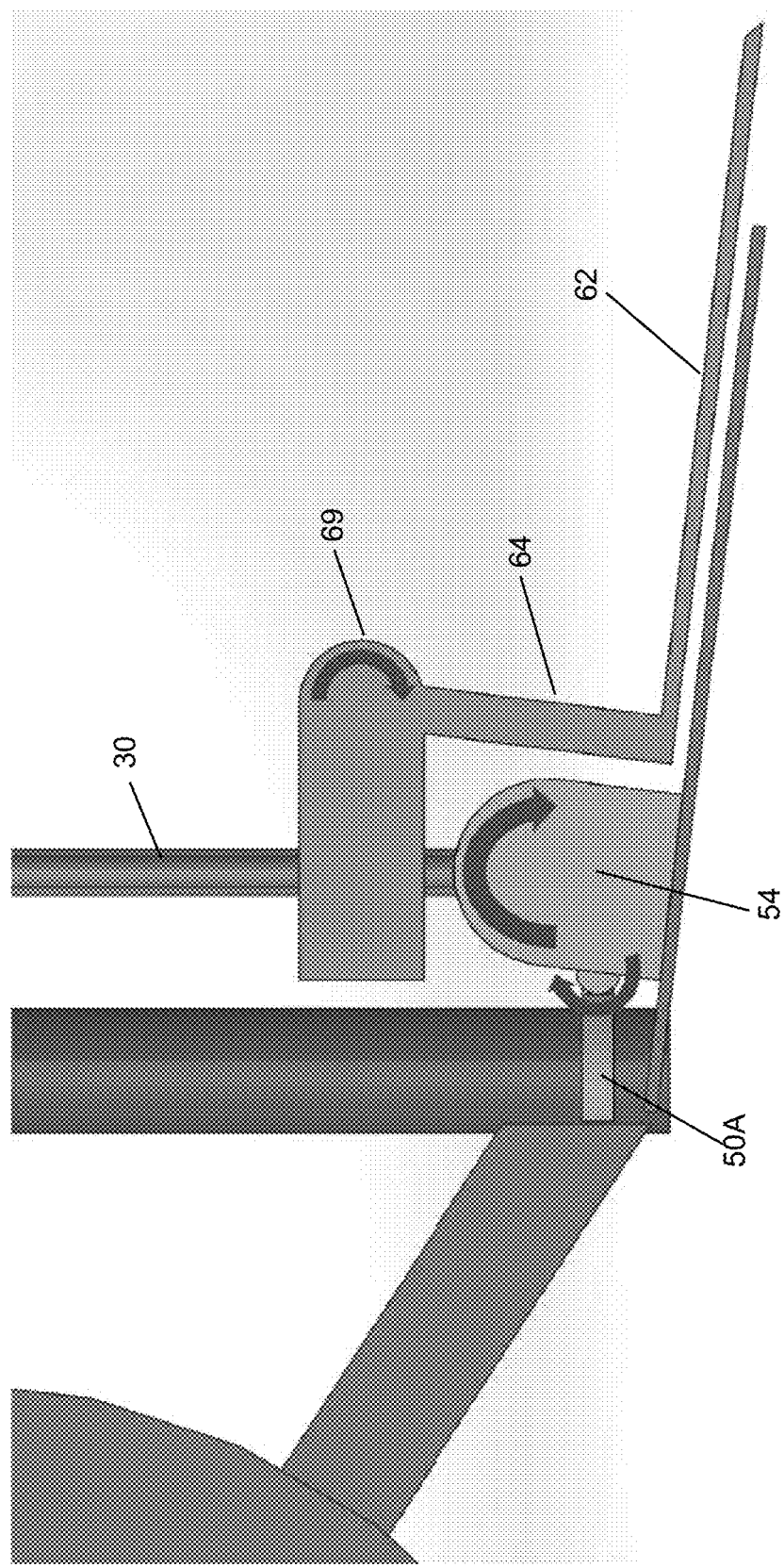
FIG. 6 is a side view of the bottom portion of the removable lift.
Figure 7:
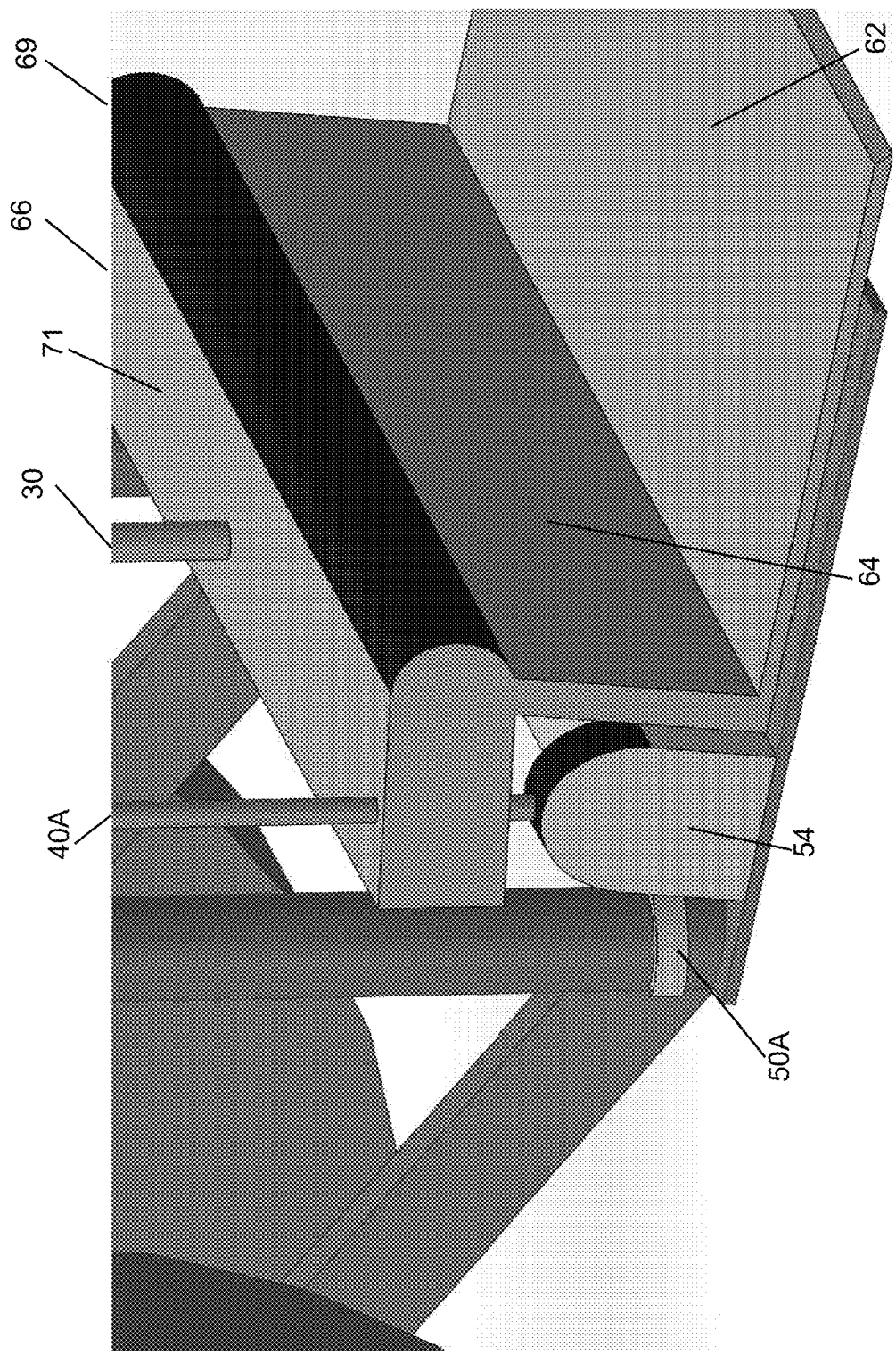
FIG. 7 is a perspective view of the bottom portion of the removable lift.
Figure 8:
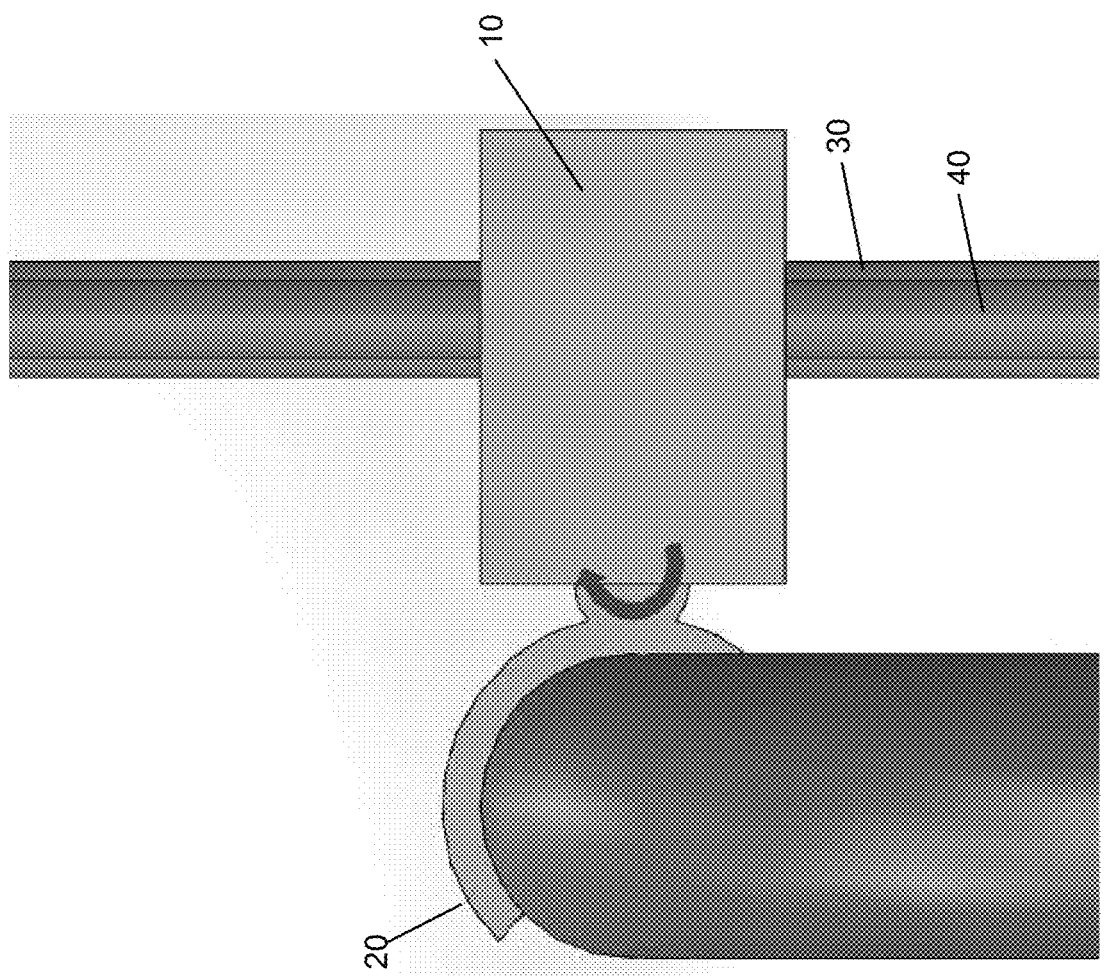
FIG. 8 is a side view of the top portion of the removable lift.

As shown in FIG. 2, the rear surface 15 of the housing may have one or more top connectors 20 A-B attached to the rear surface 15 of the housing 10. As shown in FIG. 2, the rear surface 15 may include connector apertures 8 A-B for accepting the top connectors 20 A-B. The connector apertures 8 A-B may be oblong for accepting the top connectors 20 A-B. The top connectors 20 A-B may be slidably attached to the rear surface 15 of the housing 10. In this regard, the top connectors 20 A-B may be connected to various widths of hand truck. FIG. 2 shows a top bar 154 of a hand truck. The top connectors 20 A-B may be operable for attaching the removable lift 1 to the top bar 154 of the hand truck 150. The top connectors 20 A-B may be secured to the top bar 154 using friction which allows the top connectors 20 A-B to be pulled from the top bar 154. However, the top connectors 20 A-B may also be secured using fasteners such as screws or bolts to provide a stable connection. As shown in FIG. 5, the top connectors 20 A-B may be clamps. However, the top connectors 20 A-B may also be clasps. The top connectors 20 A-B may be removable and/or replaceable. The top connectors 20 A-B may be replaced with top connectors operable for attaching the removable lift 1 to a variety of objects including vehicles, truck beds, truck tailgates, and other similar apparatus. In this regard, the removable lift 1 may be universal. The lid 18 of the housing 10 may include one or more switches 23 A-B for controlling a motor 110.

As shown in FIG. 2, the top surface 11 of the housing 10 is a lid 18. The lid 18 may be removably attached to the housing 10 using screws 19 A-C. The top housing 10 is operable to hold a motor 110 for actuating movement of the lift screw 30. The motor of the top housing is connected to the lift screw 30 by a belt 115. In this regard, the motor is used for moving the belt 115, which rotates the lift screw 30. However, in another example, the base toe plate 62 is actuated using any type of linear actuator known in the art, including mechanical linear actuators and hydraulic linear actuators. The motor is powered by a battery 118. The motor is controlled by up and down switches 23 A-B. However, in another example, the motor is controlled by using a single switch.

Figure 3:
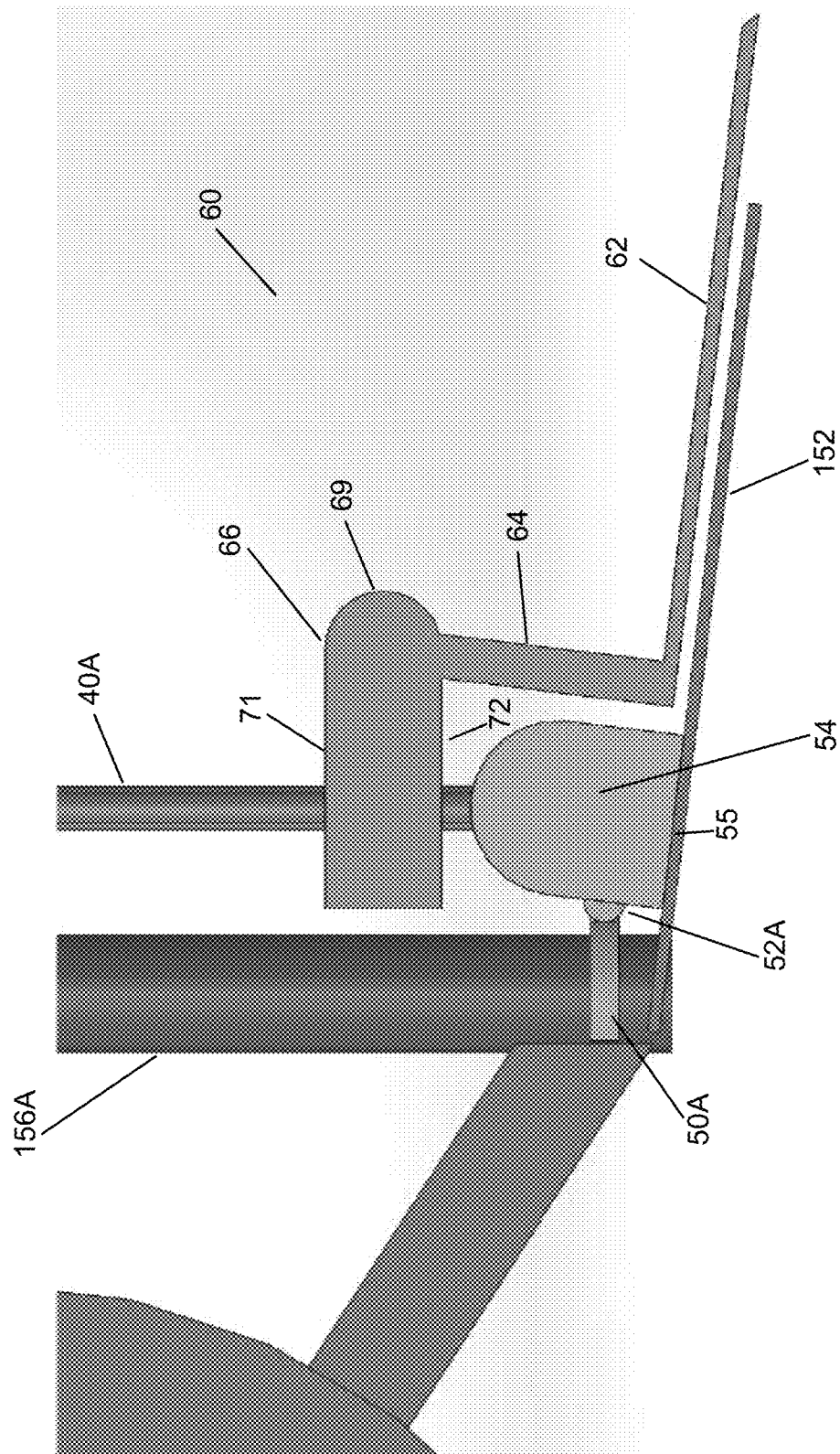
FIG. 3 is a side view of a bottom portion of the removable lift.
Figure 4:
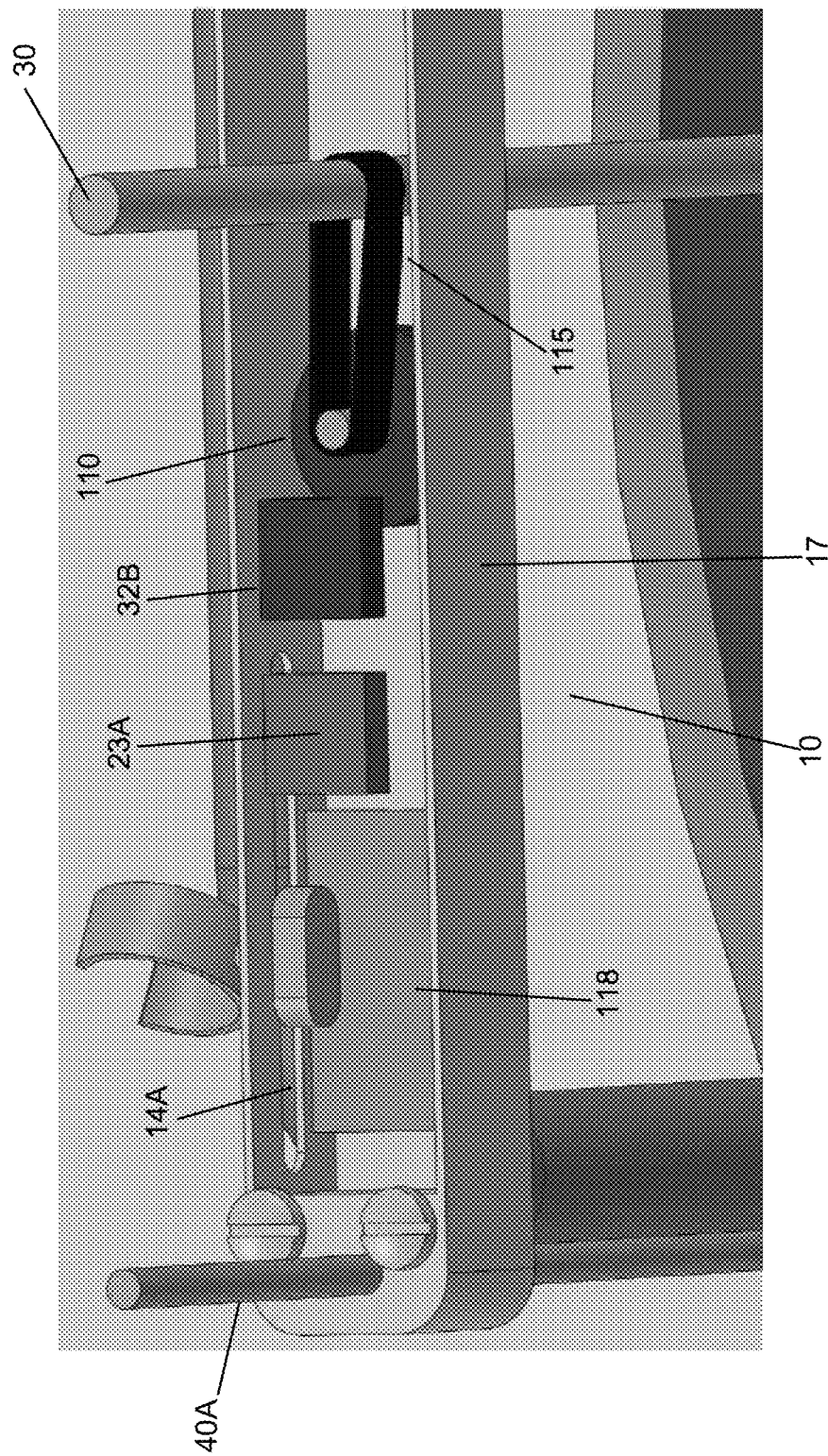
FIG. 4 is a view of the inside of the housing of the removable lift.

As shown in FIG. 3, the removable lift 1 may include a lift base 60. The lift base 60 may include a base toe plate 62 connected to a toe plate connector 64, which is connected to a base member 66. When the removable lift 1 is attached to a hand truck 150, the base toe plate 62 is above a hand truck toe plate 152. As shown in FIG. 3, the base toe plate 62 may extend beyond the dimensions of the hand truck toe plate 152. However, in another example, the base toe plate 62 may be smaller than the hand truck toe plate 152. The removable lift 1 may include a toe plate support 54 below the base member 66. The toe plate support 54 has a bottom surface 55 that is operable to rest on top of the hand truck toe plate 152. The toe plate support 54 is attached to guide rails 40 A-B. The toe plate support also supports the lift screw 30. The toe plate support 54 has one or more bottom connectors 50 A-B, pivotally attached using bottom connector pivots. The bottom connectors 50 A-B may be operable to attach the removable lift 1 to one or more side bars 156 A-B of the hand truck 150. The bottom connectors 50 A-B may be adjustable to accommodate various sizes of hand truck 150. As shown in FIG. 3, the bottom connectors 50 A-B may be clamps. However, the bottom connectors 50 A-B may also be clasps. The bottom connectors 50 A-B may be removable and/or replaceable. The bottom connectors 50 A-B may be replaced with bottom connectors operable for attaching the removable lift 1 to a variety of objects including vehicles, truck beds, truck tailgates, and other similar apparatus. In this regard, the removable lift 1 may be universal.

The base member 66 may include base member guide rail apertures 67 A-B, and a base member screw aperture 68. The base member 66 may also include a bumper 69. The base member guide rail apertures 67 A-B, and a base member screw aperture 68 extend through a top surface 71 of the base member to the bottom surface 72 of the base member 66.

In use, the removable lift is installed on a hand truck 150 by clipping the top connectors 20 A-B to the top bar 154 of a hand truck 150 and clipping the bottom connectors 50 A-B to the side bars 156 A-B of a hand truck. The toe plate support 54 is placed on top of the toe plate 152 of the hand truck. Once the removable lift 1 is connected to the hand truck 150 the removable lift 1, a load may be placed on the base toe plate 62. The load may be placed on the base toe plate 62 while the base toe plate 62 is in a low position where the base toe plate 62 is proximal to the hand truck toe plate 152. After placing a load on the base toe plate 62, the load may be lifted. A user lifts the load by pressing a switch 23 A or 23 B to cause the motor 110 to move the belt 115 which rotates the lift screw 30. Once the load has been lifted to a desired height, a user may remove the load from the base toe plate 62.

While the present disclosure has been described with reference to various embodiments, it will be understood that these embodiments are illustrative and that the scope of the disclosure is not limited to them. Those skilled in the art will appreciate that variations from the specific embodiments disclosed above are contemplated by the invention. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A removable lift for use with a hand truck, the removable lift comprising:
    a housing having a top surface, a bottom surface, a rear surface, and a front surface;
    at least one top connector;
    at least one bottom connector;
    a control panel;
    a base having a toe plate;
    at least one motor connected to a lift screw with a belt that is used to rotate the lift screw, wherein the motor is in communication with the control panel;
    a toe plate support having a bottom surface and a top surface, and at least one aperture; and
    at least one guide rail having a top end and a bottom end received by the at least one aperture, wherein the top end is connected to the housing and the bottom end is received by the base, and wherein the bottom end is connected to the toe plate support.

2. The removable lift of claim 1, wherein the at least one top connector is configured for attachment to a top bar of the hand truck.

3. The removable lift of claim 1, wherein the at least one bottom connector is configured for attachment to a side bar of the hand truck.

4. The removable lift of claim 1, wherein the at least one top connector is slidably attached to the rear surface of the housing.

5. The removable lift of claim 1, wherein the at least one bottom connector is slidably attached to the toe plate support.

6. The removable lift of claim 1, wherein the at least one top connector is pivotally attached to the rear surface of the housing.

7. The removable lift of claim 1, wherein the at least one bottom connector is pivotally attached to the toe plate support.

8. The removable lift of claim 1, wherein the motor is a hydraulic motor.

9. The removable lift of claim 1, wherein the control panel has at least one switch, wherein the at least one switch controls actuation of the toe plate.

10. A removable lift for use with a convertible hand cart, the removable lift comprising:
    a housing having a top surface, a bottom surface, a rear surface, and a front surface;
    at least one top connector connected to the rear surface of the housing;
    at least one bottom connector;
    a control panel;
    a base having a toe plate;
    at least one motor to move a belt that causes the toe plate to lift to a desired height;
    a toe plate support having a bottom surface and a top surface and at least one aperture; and
    a first guide rail and a second guide rail received by the at least one aperture, the first and second guide rails having a top end and a bottom end, wherein the top ends are connected to the housing, and the bottom ends are received by the base, and wherein the bottom ends are connected to the toe plate support.

11. The removable lift of claim 10, wherein the control panel comprises a first switch and a second switch, the first switch actuatable for moving the base in a first direction, the second switch actuatable for moving the base in a second direction opposite of the first direction.

12. The removable lift of claim 10, wherein the at least one motor is a hydraulic actuator.

13. The removable lift of claim 10, wherein the at least one top connector is a clamp.

14. The removable lift of claim 10, wherein the at least one bottom connector is a clamp.

15. The removable lift of claim 10, wherein the at least one top connector is slidably attached to the rear surface of the housing.

16. The removable lift of claim 10, wherein the removable lift is collapsible.

17. A method comprising:
attaching a removable lift to a hand truck, the removable lift comprising:
  a housing having a top surface, a bottom surface, a rear surface, and a front surface;
  at least one top connector connected to the rear surface of the housing;
  at least one bottom connector;
  a control panel;
  a base having a toe plate;
  at least one motor;
  a toe plate support having a bottom surface and a top surface and at least one aperture; and
  a first guide rail and a second guide rail received by the at least one aperture, the first guide rail and the second guide rail each having a top end and a bottom end, wherein the top ends are connected to the housing, and the bottom ends are received by the base, and wherein the bottom ends are connected to the toe plate support;
placing a load on the toe plate; and
actuating the toe plate by causing the at least one motor to move a belt that causes the toe plate to lift to a desired height to lift the load.

18. The method of claim 17, wherein the control panel includes at least one switch, further comprising actuating the toe plate by moving the at least one switch.

19. The method of claim 17, wherein the at least one top connector is a clamp and the at least one bottom connector is a clamp, wherein the at least one top connector is clamped onto a top bar of the hand truck and the at least one bottom connector is clamped onto at least one side bar of the hand truck.

* * * * *